Patented Jan. 9, 1940

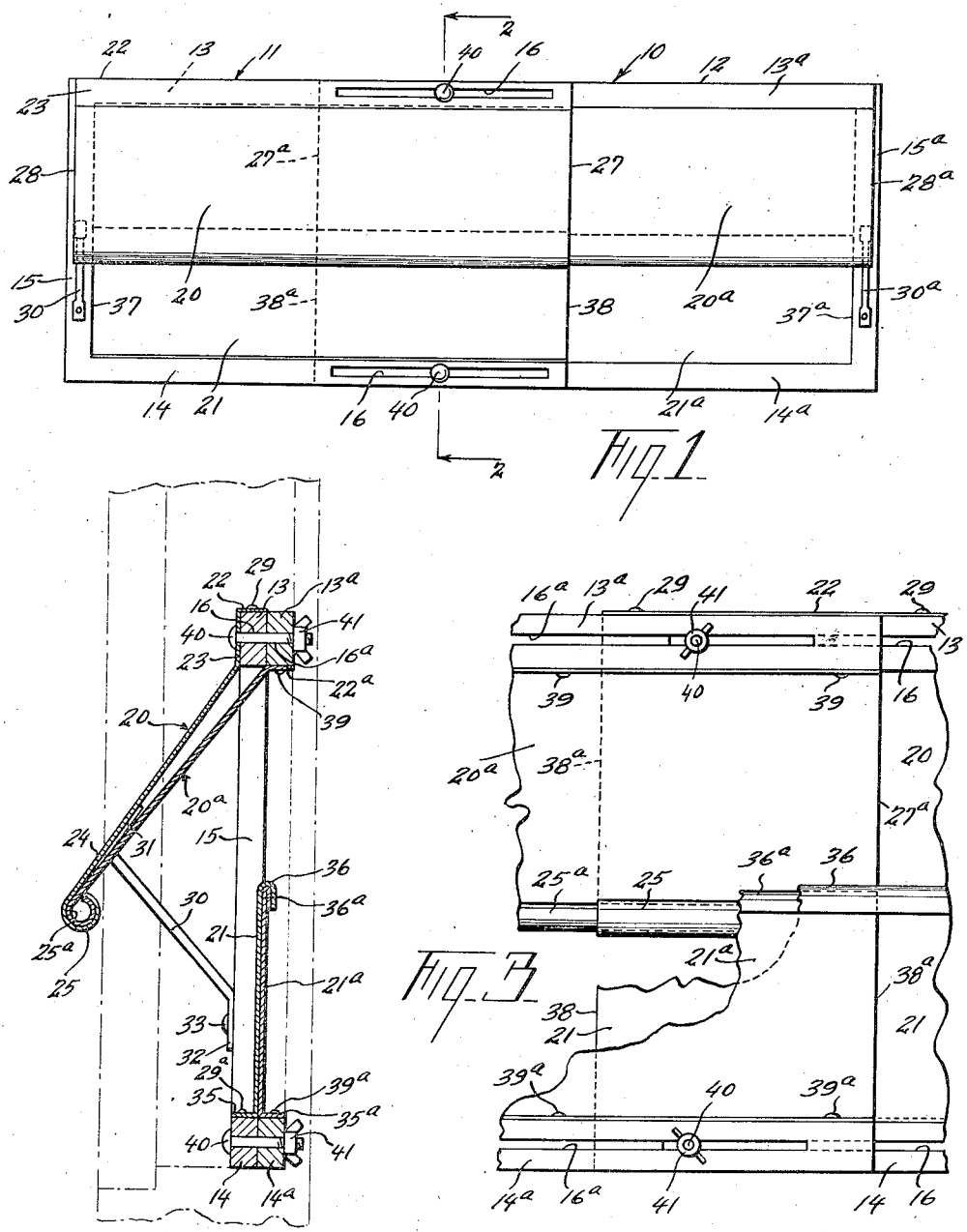

2,186,086

UNITED STATES PATENT OFFICE 2,186,086

COMBINED RAIN DEFLECTOR AND VENTILATOR

Bessie J. Wickham, Long Beach, Calif.

Application February 3, 1938, Serial No. 188,499

6 Claims. (Cl. 98—99)

This invention relates to a combined rain deflector and ventilator.

The object of this invention is to provide a rain deflector for use in a conventional window frame adapted to be placed directly beneath a raised window and so formed as to prevent rain from entering the room and at the same time allowing the entry of fresh air for ventilation.

Another object of the invention relates to forming the rain deflector in two sliding sections relatively movable with respect to each other whereby the rain deflector may be adjusted for any desired width of window.

Other objects and advantages of the invention relate to the simplicity of construction of the device, ease of handling and installation, cheapness of manufacture, durability and efficient functioning thereof for the purpose intended.

With the above and other objects in view as will hereinafter appear from the following specification, reference is had to the accompanying drawing wherein:

Figure 1 is a front elevational view of the rain deflector,

Figure 2 is a vertical sectional view thereof taken on line 2—2, Figure 1, and

Figure 3 is a rear elevational view of the rain deflector at the central portion thereof, with parts broken away to show the assembly and operation of the same.

Referring to the drawing, 10 denotes the rain deflector which comprises two frame sections 11 and 12. The frame 11 comprises parallel upper and lower strips 13 and 14, respectively joined at their outer ends by a vertical strip 15, to thus define a U-shaped frame element. The strips 13, 14 and 15 are preferably made of wood of suitable dimensions and said strips are joined together in any desired manner well known in the art. In a like manner the frame 12 comprises upper and lower strips 13a, 14a and a vertical connecting strip 15a, both frames 11 and 12 being identical. Provided in each of the strips 13, 14 and 13a, 14a is a slot 16 and 16a, extending lengthwise of said strips from a point adjacent their free terminal ends to substantially midway the length thereof as clearly shown in Figure 1, for a purpose to be hereinafter described.

On the frame section 11 is mounted a sheet metal deflector 20 and a sheet metal shield 21. The deflector 20 is formed to provide an upper rearwardly extending flange 22, a strip engaging portion 23 at right angles to the flange 22 and an outwardly and downwardly inclined deflector portion 24 terminating at its lower edge in a rolled eye portion 25. As seen in Figure 1 the deflector 20 extends lengthwise of the frame 11, the inside edge 27 being in the same plane with the terminal ends of the strips 13 and 14, while the outer edge 28 is spaced from the edge of the vertical strip 15 a sufficient distance so as not to interfere with the placement of the strip 15 between the window guide strips in a window frame. The flange 22 and the strip engaging portion 23 of the deflector engage the top and front side of the strip 13 and is rigidly secured thereto as by the nails or screws 29. To support the deflector portion 24 in its inclined position there is provided a brace or bracket 30, secured in any desired manner at its upper end to the underside of the deflector portion as at 31, and at its lower end 32 to the vertical strip 15 as by the screw or nail 33.

The shield 21 is arranged vertically inside of the frame 11 and is provided with an outwardly directed flange 35 adapted to seat on the top of the lower strip 14 and is rigidly attached thereto by the nails or screws 29a, with the body of the shield 21 lying flush with the rear sides of said strips, as clearly shown in Figure 2. The upper end of the shield 21 is provided with a bent over portion 36 of channel shape which is arranged substantially in line and preferably slightly above the plane of the eye 25 of the deflector 20. The length of the shield 21 is such that its outer end 37 abuts the inside of the vertical strip 15, while the inner end 38 is in the same plane with the terminal ends of the parallel strips 13 and 14, and with the edge 27 of the deflector 20.

The frame section 12 is also formed with a deflector 20a and a shield 21a. In this case the deflector 20a is provided at its upper end with a rearwardly directed flange 22a adapted to seat on the underside of the strip 13a and to be rigidly attached thereto by the nail or screws 39. At its lower end the deflector 20a is formed with a rolled edge or eye 25a having an outside diameter equal to or slightly less than the inside diameter of the eye 25 on the deflector 20. The deflector 20a is inclined forwardly and downwardly and is so dimensioned that the axis of the eye 25a and the eye 25 will coincide when the frame sections 11 and 12 are assembled in the manner to be hereinafter described.

The shield 21a is formed complemental to the shield 21 by the formation of a lower flange 35a adapted to seat on the upper side of the strip 14a and to be secured thereto by the nails or screws 39a, and at its upper end with a bent over bead 36a adapted to snugly and slidably fit within the channel 36 when the frame sections are assembled, so that the body of the shield 21a will be flush with the front sides of the strips 13a and 14a, and substantially co-extensive with the shield 21.

As with the deflector 20 and shield 21a, the outside edge 28a of the deflector is spaced from the edge of the vertical strip 15a with its inside edge 27a lying flush with the terminal ends of the strips 13a and 14a; and the outside edge 37a of the shield 21a abuts the inside of the strip 15a with the inside edge 38a lying flush with the terminal ends of the strips 13a and 14a. A similar bracket 30a is provided for the deflector 20a.

The frame sections 11 and 12 are assembled in telescoping arrangement, respectively in front and rear relationship, with the eye 25a of the inside deflector 20a telescoped within the eye 25 of the outside deflector 20 and the bead 36a of the inside shield 21a telescoped within the channel 36 of the outside shield 21, so as to bring the slots 16, 16a of the upper strips 13, 13a and the lower strips 14, 14a into registry. Bolts 40 are inserted through the slots 16 and 16a and are each provided with a wing-nut 41 whereby to clamp the frame sections 11 and 12 in any desired adjusted position.

It is thus seen that a continuous inclined deflector is provided for the adjustable frame extending from one end to the other and in a like manner there is provided a continuous shield. When the rain deflector 10 is placed in a window opening and properly adjusted the inclination of the deflector 20, 20a will prevent rain from beating into said window opening in the manner readily apparent, and at the same time because of the lateral open space between the deflector 20, 20a and shield 21, 21a will allow a free and unimpeded flow of air therethrough for ventilation purposes.

Where it is desired to use the rain deflector behind a screen placed in a window frame, the rain deflector 10 may be so constructed that the deflectors 20 and 20a are given a less inclination than that shown in Figure 2 so as to bring the telescoping eye portions 25, 25a closer to the shields 21, 21a to thus allow for the placement of the rain deflector beneath a window and without interfering with the screen usually placed outwardly of the window.

As various possible embodiments might be made of the above invention, and as various changes might be made in the construction of the rain deflector above set forth, it is to be understood that all matter herein set forth, or shown in the accompanying drawing, is to be interpreted as illustrative and not in a limiting sense.

Having thus described the invention, what is claimed is:

1. A rain deflector for a window frame including window guide strips comprising a pair of frame sections, each frame section being formed by parallel upper and lower strips rectangular in cross-section and of equal width and thickness and a vertical strip joined to the outer ends thereof, the open ends of one frame section being arranged in opposed relation to the open ends of the other frame section with the parallel upper and lower strips in abutting sliding relation, a sheet metal deflector attached at its upper longitudinal edge portion to the outer face and outer edge portion of the upper strip of one frame section and inclined forwardly and downwardly, a sheet metal deflector attached at its upper longitudinal edge portion to the inner edge portion of the upper strip of the other frame section and inclined forwardly and downwardly, a sheet metal shield attached at its lower longitudinal edge to the upper edge portion of the lower strip of each frame section and extending vertically upward substantially wholly within its respective frame section, said shields being so positioned that the same will slidably engage each other, and guide means formed at the free longitudinal edges of said deflectors and said shields for respective telescopic interengagement in the assembled relation of said frame sections whereby to permit relative longitudinal sliding movement of said frame sections.

2. The rain deflector as set forth in claim 1, wherein the outer transverse edge of each deflector is spaced from the outer edge of the vertical strips of said frame sections, to permit the outer edge portions of the vertical strips to be placed between the window guide strips in the window frame, the inner transverse edge of each deflector lying in the plane of the terminal ends of the upper and lower strips of its respective frame section; the outer transverse edge of each shield abutting the inside edge of the vertical strips of said frame sections and the inner transverse edge thereof lying in the said plane of said terminal ends of its respective frame section.

3. The rain deflector as set forth in claim 1, including a bracket member rigidly connected at one end to each of said inclined deflectors and at its other end to a lower portion of each of said vertical strips.

4. The rain deflector as set forth in claim 1, said deflector guide means comprising an inwardly rolled eye formed at the free outer longitudinal edge of each deflector with that formed on one deflector being of a larger diameter than that formed on the other deflector to permit telescoping interengagement thereof; said shield guide means comprising a channel formed on the shield of the outer frame section at its free upper longitudinal edge, and a bead formed on the shield of the inner frame section at its upper longitudinal edge for sliding movement in said channel, said telescoping engagement of said guide means maintaining said frame sections in assembled relation and permitting adjustment in the length of said rain deflector to accommodate the same in window openings of varying width.

5. The rain deflector as set forth in claim 1, wherein said deflector and shield guide means are located substantially in the same horizontal plane substantially midway between the upper and lower strips and in laterally spaced relation to define a ventilating opening.

6. The rain deflector as set forth in claim 1, wherein said upper and lower strips of each frame section are each provided with a like longitudinally extending slot at the free end portions thereof and arranged to register with each other, a bolt extending through the slots in said upper and lower strips and a wing nut on each bolt for clamping said strips together for adjusted positions of said frame sections.

BESSIE J. WICKHAM.